US011598675B1

(12) United States Patent
Fincham et al.

(10) Patent No.: US 11,598,675 B1
(45) Date of Patent: Mar. 7, 2023

(54) CABLE SYSTEM COMPRISING IN-LINE SENSORS

(71) Applicant: AGI SURETRACK LLC, Lenexa, KS (US)

(72) Inventors: Cole Fincham, Lenexa, KS (US); Corey Barkhurst, Lenexa, KS (US)

(73) Assignee: AGI SURETRACK LLC, Lenexa, KS (US)

( * ) Notice: Subject to any disclaimer, the term of this patent is extended or adjusted under 35 U.S.C. 154(b) by 0 days.

(21) Appl. No.: 17/815,090

(22) Filed: Jul. 26, 2022

(51) Int. Cl.
*G01K 1/14* (2021.01)
*H01R 4/2407* (2018.01)
*G01K 13/02* (2021.01)

(52) U.S. Cl.
CPC .............. *G01K 1/14* (2013.01); *G01K 13/02* (2013.01); *H01R 4/2407* (2018.01)

(58) Field of Classification Search
CPC ........ G01K 1/14; G01K 13/02; H01R 4/2407; H01R 4/24; H01R 4/2404; H01R 4/2406; H01R 4/2408
See application file for complete search history.

(56) References Cited

U.S. PATENT DOCUMENTS

| 2,655,734 | A  | 10/1953 | Ohlheiser |
| 3,163,703 | A  | 12/1964 | McLoad |
| 3,563,460 | A  | 2/1971  | Nine |
| 7,736,052 | B2 | 6/2010  | Shumaker et al. |
| 8,677,845 | B2 | 3/2014  | Pacheco Da Cunha |
| 8,806,772 | B1 | 8/2014  | Schaefer, Jr. |
| 9,015,958 | B2 | 4/2015  | Bloemendaal |
| 9,347,904 | B1 | 5/2016  | Schaefer, Jr. |
| 9,551,737 | B2 | 1/2017  | Bloemendaal et al. |
| 9,683,955 | B2 | 6/2017  | Bloemendaal et al. |
| 9,716,966 | B2 | 7/2017  | Folk |

(Continued)

FOREIGN PATENT DOCUMENTS

| CA | 2733876 C | 9/2018 |
| CN | 106873685 A | 6/2017 |
| WO | 2017207817 A1 | 7/2017 |

OTHER PUBLICATIONS

"Optimize Your Grain," OPI, OPI MCV2 Brochure, 5 pages.

(Continued)

*Primary Examiner* — Brandi N Hopkins
*Assistant Examiner* — Janice M Soto
(74) *Attorney, Agent, or Firm* — Shook, Hardy & Bacon L.L.P.

(57) ABSTRACT

A cable having a sensor for measuring variables comprises an insulation displacement contact (IDC) that is at least partially enclosed within a sensor housing having the sensor disposed therein. The IDC comprises one or more IDC sheath prongs that extend through an insulating sheath to the conducting wire of the cable. The IDC continuously extends from an IDC longitudinal first end to an IDC longitudinal second end. The sensor housing comprises a first housing side and a second housing side. When the IDC is at least partially enclosed by the sensor housing, a first housing side longitudinal first end and a second housing side longitudinal first end are proximate the IDC longitudinal first end, and a first housing side longitudinal second end and a second housing side longitudinal second end are proximate the IDC longitudinal second end.

20 Claims, 6 Drawing Sheets

(56) References Cited

U.S. PATENT DOCUMENTS

| | | |
|---|---|---|
| 9,889,583 B2 | 2/2018 | Bloemendaal |
| 9,933,383 B2 | 4/2018 | Giddings |
| 2018/0372406 A1 | 12/2018 | Leafloor et al. |
| 2019/0148844 A1* | 5/2019 | Kruzel ................. H01R 4/2408 439/391 |
| 2021/0144802 A1 | 5/2021 | Zafar et al. |

OTHER PUBLICATIONS

"Intelligent Grain Bin Monitoring and Control," AgroLog by Supertech Agroline, https//www.agrolog.io/agrolog-tms6000-intelligent-grain-bin-monitoring>, 9 pages.

"Sensor cables: Measuring feeders for concrete and steel silos," Pfeuffer, <https://www.pfeuffer.com/product/sensor-cables>, 3 pages.

\* cited by examiner

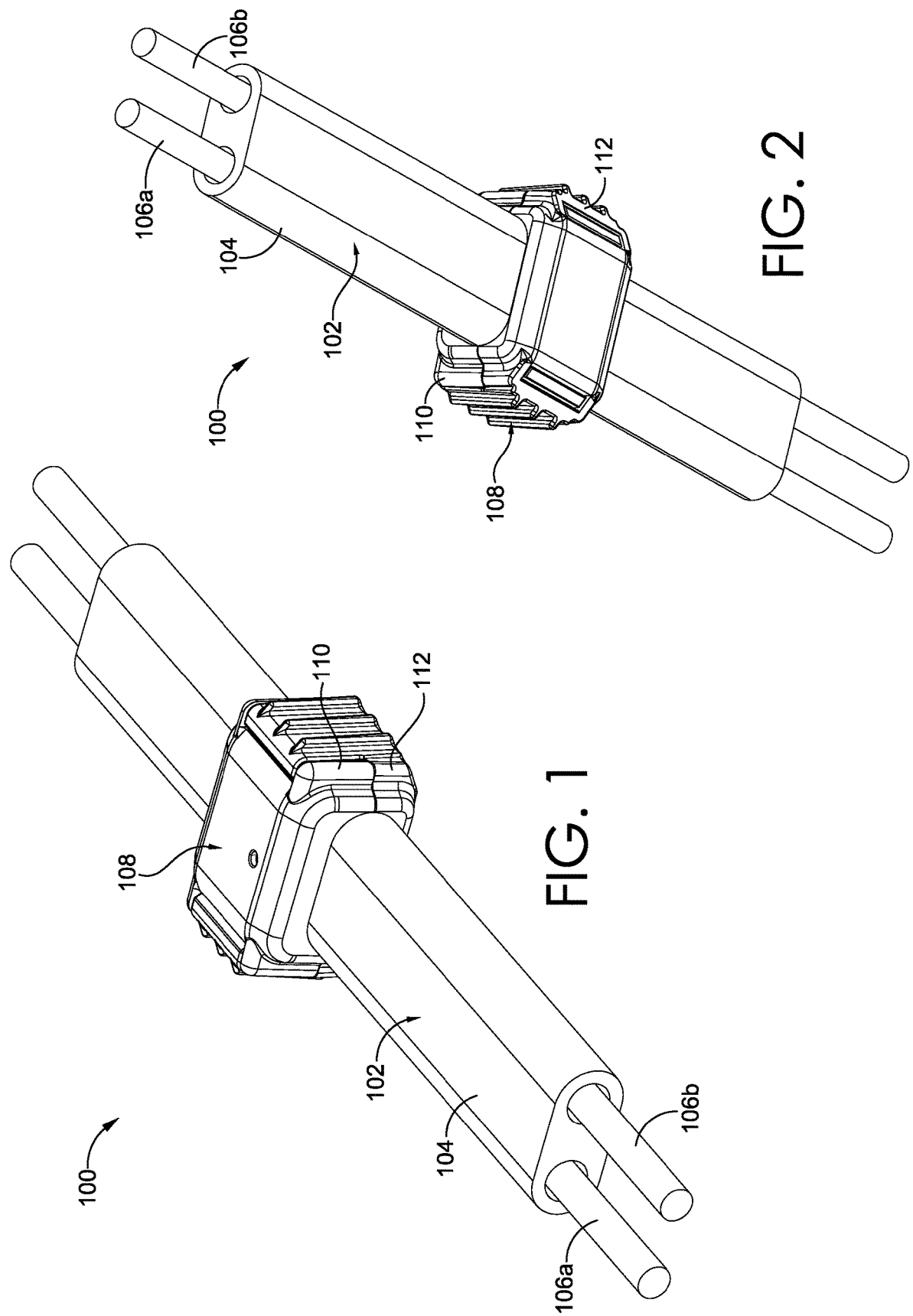

CABLE SYSTEM COMPRISING IN-LINE SENSORS

BACKGROUND

Grain bins provide storage for agricultural products, such as wheat and corn. The temperature and humidity of agricultural products in a grain bin is monitored and controlled to reduce spoilage and increase storage times. In-line cable sensors are used to monitor temperature and humidity levels at different vertical points within a grain bin.

SUMMARY

A cable system that is suitable for use in measuring properties within a grain bin is provided. A cable of the cable system includes a conducting wire encased within an insulating sheath. An insulation displacement contact (IDC) is secured to the cable via one or more IDC sheath prongs that extend through the insulating sheath to the conducting wire. One aspect of the IDC comprises the IDC continuously extending from an IDC longitudinal first end to an IDC longitudinal second end.

A sensor housing at least partially encloses the IDC. An aspect of the sensor housing includes a first housing side configured to couple with a second housing side, where the first housing side continuously extends from a first housing side longitudinal first end to a first housing side longitudinal second end, and the second housing side continuously extends from a second housing side longitudinal first end to a second housing side longitudinal second end. The first housing side and the second housing side can be coupled around the cable, where the first housing side engages the second housing side at respective lateral ends of the first housing side and the second housing side.

When the first housing side and the second housing side are coupled, the first housing side longitudinal first end and the second housing side longitudinal first end are proximate the IDC longitudinal first end, and the first housing side longitudinal second end and the second housing side longitudinal second end are proximate the IDC longitudinal second end.

A sensor can be disposed within the sensor housing and is in communication with the IDC.

This summary is intended to introduce a select of concept in a simplified form that is further described in the detailed description section of this disclosure. This summary is not intended to identify key or essential features of the claimed subject matter, nor is it intended to be an aid in determining the scope of the claimed subject matter. Additional objects, advantages, and novel features of the technology will be set forth in part in the description that follows, and in part, will become apparent to those skilled in the art upon examination of the following or learned by practice of the technology.

BRIEF DESCRIPTION OF THE DRAWINGS

The present technology is described in detail below with reference to the attached drawing figures, wherein:

FIG. 1 illustrates a top perspective view of a cable system, in accordance with an aspect described herein;

FIG. 2 illustrates a bottom perspective view of the cable system of FIG. 1, in accordance with an aspect described herein;

DETAILED DESCRIPTION

Figure 3:
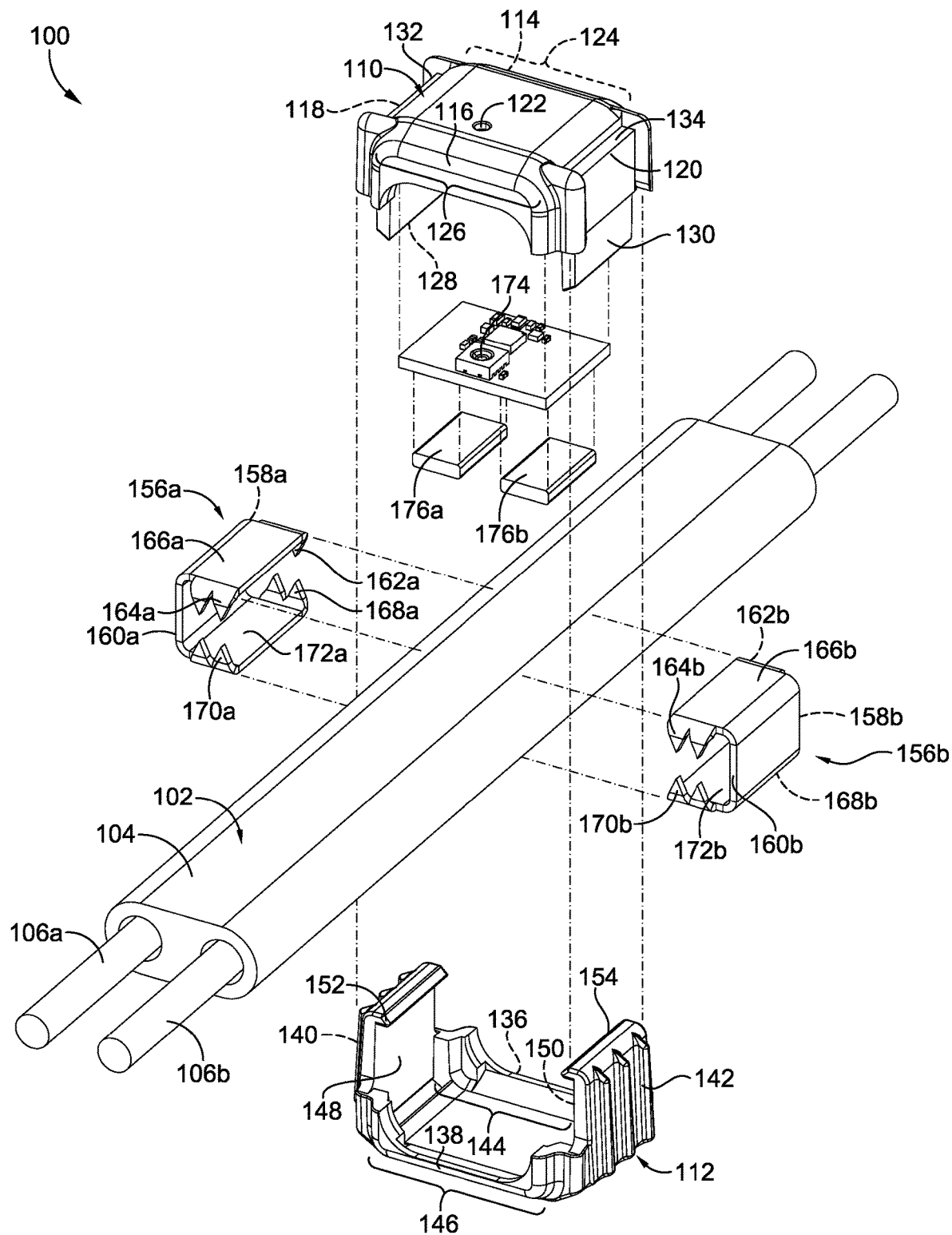
FIG. 3 illustrates an exploded view of the cable system of FIG. 1, in accordance with an aspect described herein.

Cable systems are deployed in grain bins to measure properties at different vertical points within the grain bin. Such cable systems can help monitor the moisture content of an agricultural product stored in the grain bin. Some systems, such BinManager® provided by AGI SureTrack® use cable sensors as part of an integrated grain monitoring system. In conventional monitoring systems, the cable sensors measure temperature and humidity at different vertical points along the cable, which allows for the calculation of derivate information, such as the moisture content of the agricultural product as a function of depth.

The present application provides for cable systems that can withstand greater shear forces experienced by the sensor housings along a cable. This permits use of the sensors at greater depths within the agricultural product. Moreover, the present application further provides for cable systems that are functionally easier and quicker to deploy.

As will be further described, the sensors provided by the present disclosure can be easily coupled to an IDC secured through the cable's insulating sheath. Thus, during installation, any length of cable can be cut to accommodate the height of a particular grain bin. IDCs are secured at any point along the cable, and a sensor housing comprising the desired sensor can be easily coupled around each of the IDCs. A portion of the sensor housing is congruent with a curve of the IDC, and each lateral side of the sensor housing is proximate each lateral side of the IDC. This allows the sensor housing to withstand greater shear forces in the lateral direction, thus allowing the sensors to be placed on the cable at greater debts, thereby permitting the cable system to be used with taller grain bins relative to some conventional designs.

Throughout this disclosure, the terms "longitudinal" and "lateral" are used to describe relative positions. Unless indicated otherwise, "longitudinal" is intended to refer to a relative position in a lengthwise direction. In terms of a cable, the longitudinal direction relates to the cable length as measured from a first cable end to a second cable end, whereby electrical communication passes between the first and second cable ends. Unless indicated otherwise, the "lateral" direction is intended to refer to a relative width position. In terms of the cable, the lateral direction refers to the cable width as measured from a first cable side to a second cable side, whereby a cross-section taken from the first cable side to the second cable side would bisect a conducting wire within the cable.

The example cable system previously discussed is intended to be one example provided to assist in understanding the disclosed technology and its benefits. Other examples are provided with reference to the figures.

FIG. 1 illustrates a top perspective view of cable system 100. FIG. 2 illustrates a bottom perspective view of cable system 100 of FIG. 1. Referring initially to both FIG. 1 and FIG. 2, cable system 100 is intended to illustrate one example cable system that can be practiced from this description. Other embodiments, including various arrangements, with more or fewer components, may also be understood and practiced based on the description provided herein. As such, FIG. 1 is intended to be illustrative, and such other embodiments are also intended to be within the scope of the present disclosure.

As illustrated in FIG. 1, cable system 100 comprises cable 102. Cable 102 further comprises insulating sheath 104 and a conducting wire, which in this example includes conducting wire 106a and conducting wire 106b that is encased within insulating sheath 104. It will be understood that other cable systems and conducting wire arrangements are also suitable. In general, cable 102 is intended to illustrate any cable that can be used for electrical communication, such as a cable that communicates an electrical current. As an example, a cable suitable for use as cable 102 may comprises a conducting wire, which may comprise copper or another electrically conductive material, and an insulating sheath, formed from a polymer or other non-electrically conductive material.

As also illustrated, and as will be further discussed, cable system 100 comprises sensor housing 108. Sensor housing 108 further comprises first housing side 110 and second housing side 112. First housing side 110 is configured to couple to second housing side 112 in a manner that secures sensor housing 108 around cable 102. In general, sensor housing 108 houses a sensor. Sensor housing 108 can be made of any rigid material. In embodiments, the material selected for forming sensor housing 108 is a non-electrically conductive material, such as a polymer. Non-limiting examples of material that may be suitable for use in forming sensor housing 108 comprise polyethylene (PE), polypropylene (PP), polyethylene terephthalate (PET), among others. Non-limiting example methods of forming sensor housing 108 comprise injection molding, spin molding, three-dimensional printing, polymer casting, and so forth.

Turning now to FIG. 3, an exploded view of the example cable system 100 of FIG. 1 is provided. With initial reference to sensor housing 108, as illustrated in FIG. 3, sensor housing 108 further comprises first housing side 110 and second housing side 112.

As illustrated, first housing side 110 comprises first housing side longitudinal first end 114 and first housing side longitudinal second end 116. In one embodiment, first housing side 110 is formed of a single component. First housing side 110 extends from first housing side longitudinal first end 114 to first housing side longitudinal second end 116. In an embodiment, first housing side 110 continuously extends from first housing side longitudinal first end 114 to first housing side longitudinal second end 116.

Moreover, first housing side 110 further comprises first housing side lateral first side 118 and first housing side lateral second side 120. First housing side 110 extends from first housing side lateral first side 118 to first housing side lateral second side 120. In an embodiment, first housing side 110 continuously extends from first housing side lateral first side 118 to first housing side lateral second side 120.

The example cable system 100 further comprises housing opening 122. Housing opening 122 can be positioned at a location between first housing side longitudinal first end 114 and first housing side longitudinal second end 116. For instance, housing opening 122 may be positioned on a planar area of first housing side 110 that extends between first housing side longitudinal first end 114 and first housing side longitudinal second end 116. Housing opening 122 may include an opening that extends through first housing side 110. That is, housing opening 122 of first housing side 110 may extend from an outer aspect of first housing side 110 through to an inner aspect of first housing side 110. In some aspects, housing opening 122 may comprise an air permeable material, such as a mesh, cloth, or other air permeable membrane. The air permeable material may permit air to pass through housing opening 122, while preventing debris from agricultural products from entering the inner aspect of sensor housing 108 when assembled and employed.

Continuing with first housing side 110, first housing side 110 may further comprise first housing side first curved portion 124 and first housing side second curved portion 126. As illustrated, first housing side first curved portion 124 may be positioned at first housing side longitudinal first end 114. For instance, first housing side first curved portion 124 can curve outward and away from the planar area of first housing side 110 at first housing side longitudinal first end 114. In an embodiment, first housing side first curved portion 124 integrally extends from the planar area of first housing side 110. First housing side second curved portion 126 may be positioned at first housing side longitudinal second end 116. For instance, first housing side second curved portion 126 can curve outward and away from the planar area of first housing side 110 at first housing side longitudinal second end 116. In an embodiment, first housing side second curved portion 126 integrally extends from the planar area of first housing side 110.

As noted, first housing side 110 comprises first housing side lateral first side 118 and first housing side 110. At first housing side lateral first side 118, first housing side 110 comprises a first side that extends away from the planar area of first housing side 110. At first housing side lateral second side 120, first housing side 110 comprises a second side that extends away from the planar area of first housing side 110. In an embodiment, the first side integrally extends from the planar area of first housing side 110, and the second side integrally extends from the planar area of first housing side 110.

The first side, extending away from first the planar area of first housing side 110 at first housing side lateral first side 118, comprises first outer surface of the first housing side lateral first side 128. First outer surface of the first housing side lateral first side 128 is opposite an inner surface of the first side that corresponds to the inner aspect of sensor housing 108, as will be described. The second side, extending away from the planar area of first housing side 110 at first housing side lateral second side 120, comprises second outer surface of the first housing side lateral second side 130. Second outer surface of the first housing side lateral second side 130 is opposite an inner surface of the second side that corresponds to the inner aspect.

In an aspect, first housing side first curved portion 124 and first housing side second curved portion 126 curve outward and away from the planar area of first housing side 110 in a direction that is the same as the direction in which the first side and the second side extend from the planar area of first housing side 110. In a particular aspect, a length of the first side and the second side, as measured from the planar area to an opposite end of the first side and the second side, is greater than a length of first housing side first curved portion 124 and first housing side second curved portion 126 as measured from the planar area in a direction in which the first side and the second side extend from the planar area of first housing side 110.

In this particular example, first housing side 110 comprises first notch of the first housing side lateral first side 132 and second notch of the first housing side lateral second side 134. Here, each of first notch of the first housing side lateral first side 132 and second notch of the first housing side lateral second side 134 facilitate coupling first housing side 110 to second housing side 112. First notch of the first housing side lateral first side 132 may be positioned at a location where the first side extends from the planar area of first housing side 110 and extend along the outer aspect in a direction from first housing side longitudinal first end 114 to first housing side longitudinal second end 116. Second notch of the first housing side lateral second side 134 may be positioned at a location where the second side extends from the planar area of first housing side 110 and extend along the outer aspect in the direction from first housing side longitudinal first end 114 to first housing side longitudinal second end 116. In the example illustrated, first notch of the first housing side lateral first side 132 and second notch of the first housing side lateral second side 134 are integrally formed as part of a single component forming first housing side 110. As discussed, first housing side 110 couples to second housing side 112, and in the example cable system 100 described, first notch of the first housing side lateral first side 132 and second notch of the first housing side lateral second side 134 facilitate the coupling in conjunction with components of second housing side 112, which will be further described. This is just one example suitable for coupling first housing side 110 and second housing side 112, and other designs, mechanisms, and devices may be suitable and are intended to be within the scope of this disclosure.

Referring now to second housing side 112, second housing side 112 comprises second housing side longitudinal first end 136 and second housing side longitudinal second end 138. In one embodiment, second housing side 112 is formed of a single component. Second housing side 112 extends from second housing side longitudinal first end 136 to second housing side longitudinal second end 138. In an embodiment, second housing side 112 continuously extends from second housing side longitudinal first end 136 to second housing side longitudinal second end 138. In the example embodiment illustrated, second housing side 112 comprises a planar area that extends between second housing side longitudinal first end 136 and second housing side longitudinal second end 138.

As also shown, second housing side 112 further comprises second housing side lateral first side 140 and second housing side lateral second side 142. Second housing side 112 extends from second housing side lateral first side 140 to second housing side lateral second side 142. In an embodiment, second housing side 112 continuously extends from second housing side lateral first side 140 to second housing side lateral second side 142. As illustrated, the planar area of second housing side 112 may further be positioned between second housing side lateral first side 140 and second housing side lateral second side 142.

Second housing side 112 may further comprise second housing side first curved portion 144 and second housing side second curved portion 146. As illustrated, second housing side first curved portion 144 may be positioned at second housing side lateral first side 140 of second housing side 112. For instance, second housing side first curved portion 144 can curve outward and away from the planar area of second housing side 112 at second housing side longitudinal first end 136. In an embodiment, second housing side first curved portion 144 integrally extends from the planar area of second housing side 112. Second housing side second curved portion 146 may be positioned at second housing side longitudinal second end 138 of second housing side 112. For instance, second housing side second curved portion 146 can curve outward and away from the planar area of second housing side 112 at second housing side longitudinal second end 138. In an embodiment, second housing side second curved portion 146 integrally extends from the planar area of second housing side 112.

Second housing side 112, as illustrated, comprises a first side that extends away from the planar area of second housing side 112 at second housing side lateral first side 140. At second housing side lateral second side 142, second housing side 112 comprises a second side that extends away from the planar area of second housing side 112. In an embodiment, the first side integrally extends from the planar area of second housing side 112, and the second side integrally extends from the planar area of second housing side 112.

The first side, extending away from first the planar area of second housing side 112 at second housing side lateral first side 140, comprises first inner surface of the second housing side lateral first side 148. First inner surface of the second housing side lateral first side 148 is opposite an outer surface of the first side. First inner surface of the second housing side lateral first side 148 may correspond to an inner aspect of second housing side 112, which will be further discussed. The second side, extending away from the planar area of second housing side 112 at second housing side lateral second side 142, comprises second inner surface of the second housing side lateral second side 150. Second inner surface of the second housing side lateral second side 150 is opposite an outer surface of the second side. Second inner surface of the second housing side lateral second side 150 may correspond to the inner aspect of the second housing side 112.

In an aspect, second housing side first curved portion 144 and second housing side second curved portion 146 curve outward and away from the planar area of second housing side 112 in a direction that is the same as the direction in which the first side and the second side extend from the planar area of second housing side 112. In a particular aspect, a length of the first side and the second side, as measured from the planar area to an opposite end of the first side and the second side, respectively, is greater than a length of second housing side first curved portion 144 and second housing side second curved portion 146 as measured from the planar area in a direction in which the first side and the second side extend from the planar area of second housing side 112.

As shown in FIG. 3, an end of the first side of second housing side 112 that is opposite an end of the first side the extends from the planar area comprises first hook of the second housing side lateral first side 152. An end of the second side of second housing side 112 that is opposite and end of the second side that extends from the planar area comprises second hook of the second housing side lateral second side 154. In an aspect, first hook of the second housing side lateral first side 152 integrally extends away from the first side, while second hook of the second housing side lateral second side 154 integrally extends away from the second side. First hook of the second housing side lateral first side 152 may extend in a direction toward second housing side lateral second side 142, and second hook of the second housing side lateral second side 154 may extend in a direction toward second housing side lateral first side 140. Each of first hook of the second housing side lateral first side 152 and second hook of the second housing side lateral second side 154 may extend along a direction from second housing side longitudinal first end 136 to second housing side longitudinal second end 138.

In an embodiment, first hook of the second housing side lateral first side 152 extends from the first side of second housing side 112 in a manner that forms an angle that is substantially equivalent to or equivalent to an angle formed by first notch of the first housing side lateral first side 132, such that first hook of the second housing side lateral first side 152 is configured to nest within first notch of the first housing side lateral first side 132. Similarly, second hook of the second housing side lateral second side 154 extends from the second side of second housing side 112 in a manner that forms an angle that is substantially equivalent to or equivalent to an angle formed by second notch of the first housing side lateral second side 134, such that second hook of the second housing side lateral second side 154 is configured to nest within second notch of the first housing side lateral second side 134.

The illustrated structures of first housing side 110 and second housing side 112 provide one example system for coupling first housing side 110 to second housing side 112 around cable 102 to form aspects of cable system 100. In doing so, first inner surface of the second housing side lateral first side 148 and second inner surface of the second housing side lateral second side 150 are positioned such that each respectively abuts first outer surface of the first housing side lateral first side 128 and second outer surface of the first housing side lateral second side 130. In this configuration, first hook of the second housing side lateral first side 152 and second hook of the second housing side lateral second side 154 respectively nest within first notch of the first housing side lateral first side 132 and second notch of the first housing side lateral second side 134, thereby coupling first housing side 110 with second housing side 112. When first housing side 110 and second housing side 112 are coupled, sensor housing 108 is formed having an inner aspect, e.g., an interior aspect through which cable 102 passes. The outer aspect, e.g., an external aspect, is opposite the inner aspect of sensor housing 108.

In an embodiment, first housing side 110 and second housing side 112 are releasably coupled based on a bias applied by the first side and the second side of second housing side 112, which holds first hook of the second housing side lateral first side 152 within first notch of the first housing side lateral first side 132 and second hook of the second housing side lateral second side 154 within second notch of the first housing side lateral second side 134. In this example, the bias is created when positioning first inner surface of the second housing side lateral first side 148 against first outer surface of the first housing side lateral first side 128 and second inner surface of the second housing side lateral second side 150 against second outer surface of the first housing side lateral second side 130.

Figure 5:
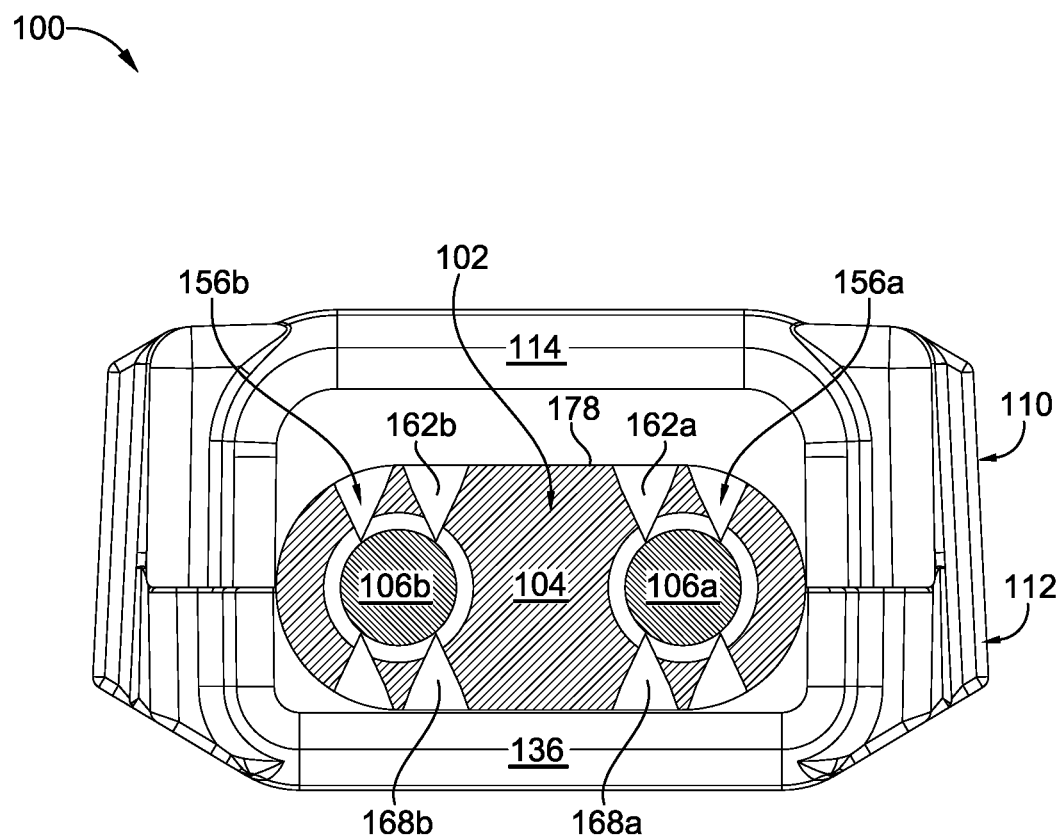
FIG. 5 illustrates a longitudinal side view of the cable system of FIG. 1 with a cross-section of the insulating sheath and the conducting wire, in accordance with an aspect described herein.

In an aspect, when first housing side 110 and second housing side 112 are coupled, first housing side first curved portion 124 and second housing side first curved portion 144 form an opening of sensor housing 108 that is between first housing side longitudinal first end 114 and second housing side longitudinal first end 136. Likewise, first housing side second curved portion 126 and second housing side second curved portion 146 form an opening of sensor housing 108 that is between first housing side longitudinal second end 116 and second housing side longitudinal second end 138. Each opening may comprise an opening perimeter that is substantially equivalent to or equivalent to an outer cross-sectional edge of insulating sheath 104 of cable 102. In this way, when coupled, first housing side 110 and second housing side 112 provide a seal around cable 102 that helps reduce debris from entering into the inner aspect of sensor housing 108. An example illustration is provided with reference to FIG. 5. In this illustration, edge 178 is illustrative of the opening perimeter of the opening formed between first housing side longitudinal first end 114 and second housing side longitudinal first end 136, which corresponds to an outer cross-sectional edge of insulating sheath 104 of cable 102.

With reference back to FIG. 3, first housing side 110 and second housing side 112 may be coupled such that one or more IDCs, such as IDC 156a or IDC(2) 156b, are at least partially enclosed within sensor housing 108, e.g., enclosed within the inner aspect of sensor housing 108. The one or more IDCs may be formed entirely of, or at least partially of, a conductible material, such as a conductible metal.

While cable system 100 is illustrated as having two IDCs, it is contemplated that any number of IDCs could be used with the technology, including only one IDC. As such, reference is generally made to IDC 156a unless otherwise indicated. It will be understood that those elements described in connection with IDC 156a may also correspond to components illustrated with respect to IDC(2) 156b. Moreover, the one or more IDCs illustrated and described with reference to the technology provide just one example. Other IDC configurations, including those having more or less components, may be suitable for use with the technology, and such IDC configurations are intended to be within the scope of this disclosure.

Thus, referring to IDC 156a, in the example embodiment shown, IDC 156a is a single component. Here, IDC 156a extends from IDC longitudinal first end 158a to IDC longitudinal second end 160a. IDC 156a generally comprises one or more IDC sheath prongs. In the example shown, IDC 156a comprises eight sheath prongs, although it will be understood IDC 156a may comprises any number of IDC sheath prongs. For brevity when describing the technology, four IDC sheath prongs of IDC 156a are labeled and discussed with reference to FIG. 3. Some IDC sheath prongs facilitate piercing of insulating sheath 104, as will be further discussed, so as to contact the conducting wire, such as conducting wire 106a or conducting wire 106b, thereby providing electrical communication between the conducting wire and the IDC.

In this example, IDC 156a comprises one or more IDC sheath prongs that include first IDC sheath prong 162a and second IDC sheath prong 164a. IDC 156a further comprises first IDC planar portion 166a that extends from IDC longitudinal first end 158a to IDC longitudinal second end 160a. As illustrated, first IDC sheath prong 162a curves away from first IDC planar portion 166a at IDC longitudinal first end 158a, and second IDC sheath prong 164a curves away from first IDC planar portion 166a at IDC longitudinal second end 160a. Each of first IDC sheath prong 162a and second IDC sheath prong 164a may taper to a point when curving away from first IDC planar portion 166a. In an aspect, first IDC sheath prong 162a and second IDC sheath prong 164a each integrally curve away from first IDC planar portion 166a.

As also illustrated in this example, IDC 156a comprises third IDC sheath prong 168a and fourth IDC sheath prong 170a. IDC 156a further comprises second IDC planar portion 172a that extends from IDC longitudinal first end 158a to IDC longitudinal second end 160a. As illustrated, third IDC sheath prong 168a curves away from second IDC planar portion 172a at IDC longitudinal first end 158a, and fourth IDC sheath prong 170a curves away from second IDC planar portion 172a at IDC longitudinal second end 160a. In the example shown, third IDC sheath prong 168a and fourth IDC sheath prong 170a, when in the clamped position as illustrated, curve in a direction toward first IDC planar portion 166a, and while in the clamped position, first IDC sheath prong 162a and second IDC sheath prong 164a curve in a direction toward second IDC planar portion 172a. Each of third IDC sheath prong 168a and fourth IDC sheath prong 170a may taper to a point when curving away from second IDC planar portion 172a. In an aspect, third IDC sheath prong 168a and fourth IDC sheath prong 170a each integrally curve away from second IDC planar portion 172a.

As noted, some aspects of IDC 156a comprise a single component. As such, first IDC planar portion 166a and second IDC planar portion 172a may extend along theoretical parallel planes when in the clamped position. First IDC planar portion 166a may be coupled to second IDC planar portion 172a via an intermediate portion of IDC 156a. In a particular aspect, IDC 156a is bent at the intermediate portion to transition first IDC planar portion 166a and second IDC planar portion 172a into parallel or substantially parallel positions, thereby transitioning IDC 156a into the clamped position.

IDC(2) 156b comprises IDC(2) longitudinal first end 158b, IDC(2) longitudinal second end 160b, first IDC(2) sheath prong 162b, second IDC(2) sheath prong 164b, first IDC(2) planar portion 166b, third IDC(2) sheath prong 168b, fourth IDC(2) sheath prong 170b, and second IDC(2) planar portion 172b. Such elements correspond to, and at least in this particular example embodiment, are structurally equivalent to, the elements of IDC 156a described previously. IDC(2) 156b is provided to illustrate how a second IDC may be used as part of cable system 100.

When first housing side 110 is coupled to second housing side 112, such that the one or more IDCs, such as IDC 156a and IDC(2) 156b, are at least partially enclosed within sensor housing 108, first housing side first curved portion 124 is proximate, e.g., abuts or is otherwise generally adjacent to, IDC longitudinal first end 158a and IDC(2) longitudinal first end 158b. First housing side second curved portion 126 is proximate second IDC sheath prong 164a and second IDC(2) sheath prong 164b. Second housing side first curved portion 144 is proximate third IDC sheath prong 168a and third IDC(2) sheath prong 168b. Second housing side second curved portion 146 is proximate fourth IDC sheath prong 170a and fourth IDC(2) sheath prong 170b.

First housing side first curved portion 124 may curve in a manner congruent with which first IDC sheath prong 162a or first IDC(2) sheath prong 162b respectively curves away from first IDC planar portion 166a or first IDC(2) planar portion 166b. That is, a radius or arch of curvature formed by first housing side first curved portion 124 is substantially equivalent to or equivalent to the radius or arc of curvature formed by first IDC sheath prong 162a or first IDC(2) sheath prong 162b. First housing side second curved portion 126 may curve in a manner congruent with which second IDC sheath prong 164a or second IDC(2) sheath prong 164b respectively curves away from first IDC planar portion 166a or first IDC(2) planar portion 166b.

Continuing, second housing side first curved portion 144 may curve in a manner congruent with which third IDC sheath prong 168a or third IDC(2) sheath prong 168b respectively curves away from second IDC planar portion 172a or second IDC(2) planar portion 172b. Second housing side second curved portion 146 may curve in a manner congruent with which fourth IDC sheath prong 170a or fourth IDC(2) sheath prong 170b respectively curves away from second IDC planar portion 172a or second IDC(2) planar portion 172b.

Figure 4A:
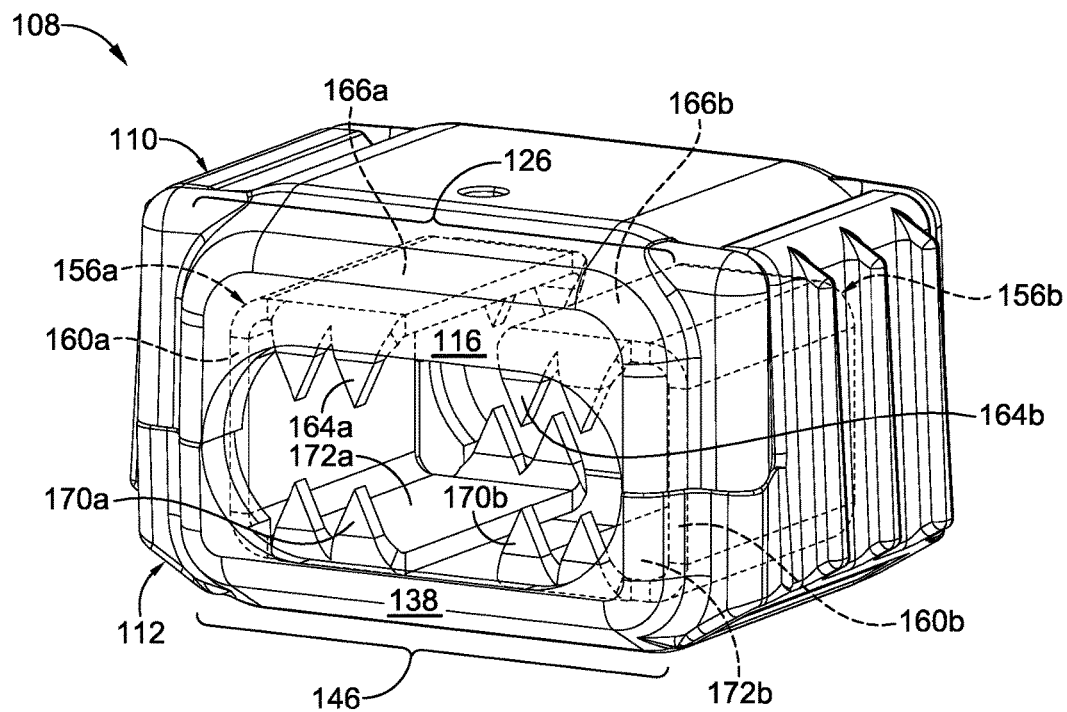
FIG. 4A illustrates a side perspective view of a sensor housing of the cable system of FIG. 1 having an insulating sheath and conducting wire of a cable removed, in accordance with an aspect described herein.

FIG. 4A is provided as an illustrative example. FIG. 4A illustrates a side perspective view of sensor housing 108 of cable system 100 of FIGS. 1-3. In this view, cable 102, including insulating sheath 104 and the conducting wire comprising conducting wire 106a and conducting wire 106b have been removed. Here, FIG. 4A shows first housing side longitudinal second end 116 proximate IDC longitudinal second end 160a and IDC(2) longitudinal second end 160b when first housing side 110 and second housing side 112 are coupled. Further, second housing side longitudinal second end 138 is also proximate IDC longitudinal second end 160a and IDC(2) longitudinal second end 160b when first housing side 110 and second housing side 112 are coupled. Second IDC sheath prong 164a and second IDC(2) sheath prong 164b at least partially curve congruent with first housing side second curved portion 126. Fourth IDC sheath prong 170a and fourth IDC(2) sheath prong 170b at least partially curve congruent with second housing side second curved portion 146.

Figure 4B:
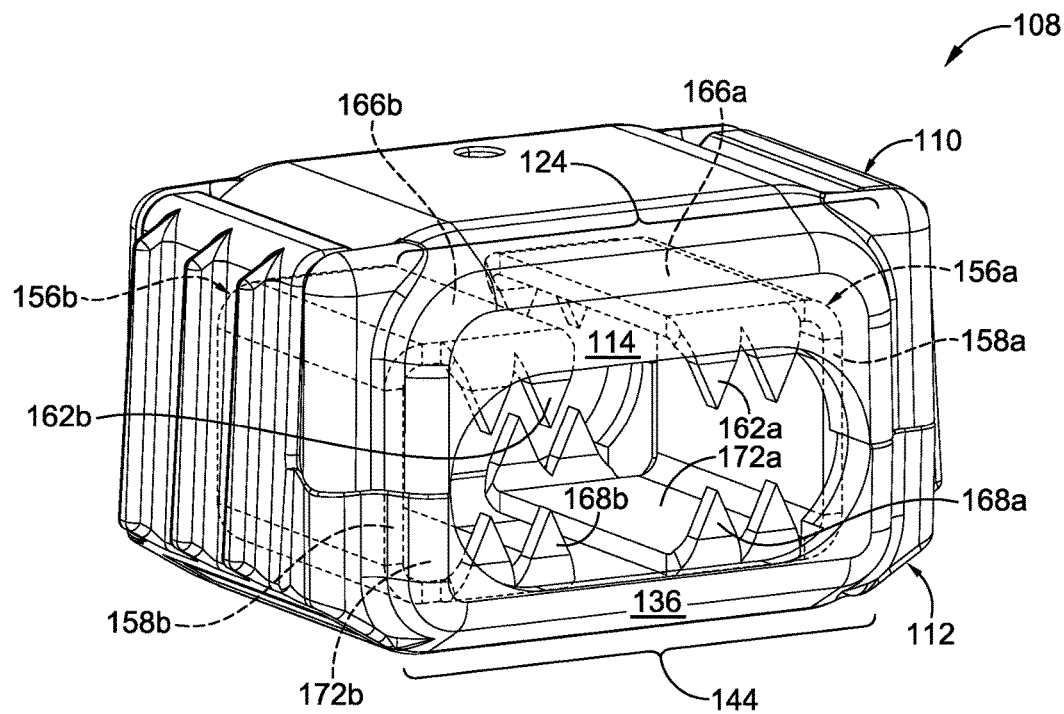
FIG. 4B illustrates another side perspective view of the sensor housing of the cable system of FIG. 1 having the insulating sheath and conducting wire of the cable removed, in accordance with an aspect described herein.

FIG. 4B is also provided as another illustrative example. FIG. 4B illustrates another side perspective view of sensor housing 108 of cable system 100 of FIGS. 1-4A. Similarly, cable 102, including insulating sheath 104 and the conducting wire comprising conducting wire 106a and conducting wire 106b have been removed. FIG. 4B shows first housing side longitudinal first end 114 proximate IDC longitudinal first end 158a and IDC(2) longitudinal first end 158b when first housing side 110 and second housing side 112 are coupled. Second housing side longitudinal first end 136 is also proximate IDC longitudinal first end 158a and IDC(2) longitudinal first end 158b when first housing side 110 and second housing side 112 are coupled. First IDC sheath prong 162a and first IDC(2) sheath prong 162b at least partially curve congruent with first housing side first curved portion 124. Third IDC sheath prong 168a and third IDC(2) sheath prong 168b at least partially curve congruent with second housing side first curved portion 144.

This configuration gives sensor housing 108 substantial resistance against shear forces experienced by sensor housing 108 when cable system 100 is in use, such as being provided in a grain bin at a vertical depth of agricultural product. When in use, the agricultural product within the grain bin applies a shear force on sensor housing 108. By coupling first housing side 110 to second housing side 112 in such a manner that first housing side longitudinal first end 114 and second housing side longitudinal first end 136 are proximate IDC longitudinal first end 158a or IDC(2) longitudinal first end 158b, and first housing side longitudinal second end 116 and second housing side longitudinal second end 138 are proximate IDC longitudinal second end 160a or IDC(2) longitudinal second end 160b, and sometimes where IDC 156a or IDC(2) 156b is a single component, sensor housing 108 is able to withstand greater shear forces relative to some conventional sensor housing systems, thereby allowing sensor housing 108 to position sensor 174 at greater vertical depths of an agricultural product within a grain bin.

With reference back to FIG. 3, sensor housing 108 houses a sensor, such as sensor 174. Sensor 174 may be disposed within the inner aspect of sensor housing 108. As illustrated, sensor 174 is disposed within first housing side 110 of sensor housing 108 when first housing side 110 is coupled to second housing side 112 around cable 102. Sensor 174 may be positioned within first housing side 110 such that sensor 174 is proximate housing opening 122, e.g., being positioned such that air flowing through housing opening 122, or any air permeable material thereof, interacts with sensor 174.

In general, sensor 174 may be any sensor that detects or measures a physical property. One sensor that can be used measures temperature and relative humidity. Such sensors can be used to determine the moisture content of an agricultural product at a particular vertical position. Other sensors that may be suitable measure carbon dioxide, oxygen, nitrogen, or other gases. Sensors that detect byproducts of spoilage may be used.

Sensor 174 may be in electrical communication with the one or more IDCs, such as IDC 156a and IDC(2) 156b. In doing so, sensor 174 may be provided a source of power from cable 102 via the one or more IDCs being in contact with a conducting wire of cable 102. Moreover, sensor 174 may communicate via cable 102 based on the electrical communication. In the arrangement shown, cable 102 is used to supply sensor 174 with operational power, and for receiving and transmitting communication signals to and from sensor 174.

To facilitate electrical communication between sensor 174 and the one or more IDCs, cable system 100 further comprises one or more conductible compression gaskets, illustrated as conductible compression gasket 176a and second conductible compression gasket 176b. In the configuration shown, the one or more conductible compression gaskets are electrically conductive. The one or more conductible compression gaskets have a bias, such that the one or more conductible compression gaskets compress against the bias between IDC 156a and IDC(2) 156b and sensor 174, or another device, such as a printed circuit board (PCB) comprising sensor 174, or another electrically conductive component in communication with sensor 174. When coupling first housing side 110 to second housing side 112 the one or more conductible compression gaskets are compressed against the bias and held against the bias based on the coupling. In doing so, the one or more conductible compression gaskets maintain contact with IDC 156a and IDC(2) 156b, thereby creating a stable communication pathway between the conducting wire of cable 102 and sensor 174.

Figure 6:
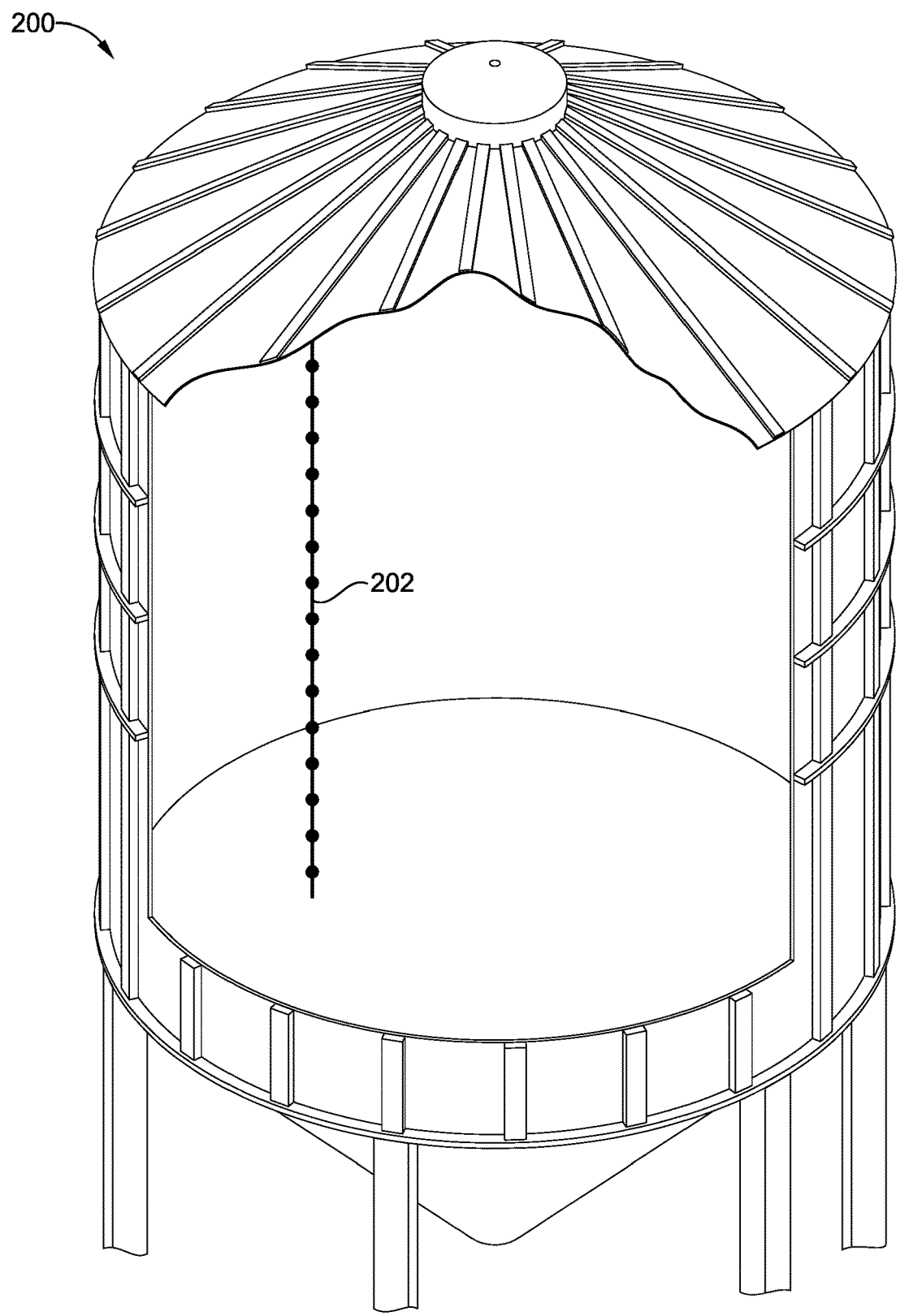
FIG. 6 illustrates cable system having a series of sensors employed for use in a grain bin, in accordance with an aspect described herein.

Referring now to FIG. 6, the figure illustrates cable system 202 having a series of sensors being employed for use in grain bin 200.

Figure 7:
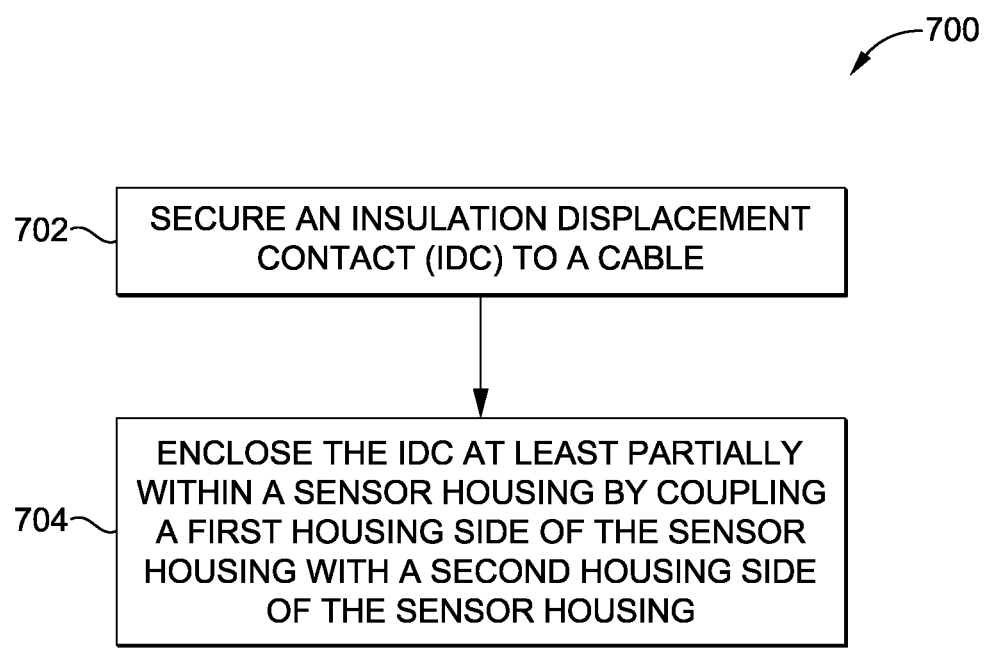
FIG. 7 is a block diagram illustrating an example method of assembling a sensor housing, in accordance with an aspect described herein.

Turning now to FIG. 7, the figure illustrates a block diagram of an example method 700 for assembling a sensor housing. At block 702, an IDC is secured to a cable. The cable may comprise a conducting wire and insulating sheath. The IDC can be secured to the cable by penetrating the insulating sheath with one or more IDC sheath prongs of the IDC. The insulating sheath may be pierced such that the one or more IDC sheath prongs engage the conducting wire. Any of the IDCs and cables described herein may be used. To penetrate the insulating sheath, pressure may be applied to a first IDC planar portion and a second IDC planar portion. In embodiments where the first IDC planar portion is coupled to the second IDC planar portion, each may be bent about an intermediate portion such that an IDC sheath prong extending away from the first IDC planar portion and an IDC sheath prong extending away from the second IDC planar portion each engage opposite sides of the insulating sheath, thus clamping the IDC onto the cable while the sheath prongs penetrate the insulating sheath.

At block 704, the IDC is at least partially enclosed within a sensor housing. This can be done, for instance, by coupling a first housing side of the sensor housing with a second housing side of the sensor housing. Any of the sensor housings, including first housing sides and second housing sides described herein may be used. The first housing side can be coupled to the second housing side, and around the insulating sheath, at respective lateral sides of the first housing side and the second housing side.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

In addition, words such as "a" and "an," unless otherwise indicated to the contrary, include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

Some example aspects that can be practiced from the forgoing description include:

Aspect 1: A cable comprising a conducting wire encased within an insulating sheath, an insulation displacement contact (IDC) comprising one or more IDC sheath prongs extending through the insulating sheath to the conducting wire, the IDC continuously extending from an IDC longitudinal first end to an IDC longitudinal second end, a sensor housing at least partially enclosing the IDC, the sensor housing comprises a first housing side configured to couple with a second housing side, the first housing side continuously extending from a first housing side longitudinal first end to a first housing side longitudinal second end, the second housing side continuously extending from a second housing side longitudinal first end to a second housing side longitudinal second end, where the first housing side longitudinal first end and the second housing side longitudinal first end are proximate the IDC longitudinal first end, and where the first housing side longitudinal second end and the second housing side longitudinal second end are proximate the IDC longitudinal second end, and a sensor disposed within the sensor housing and in communication with the IDC.

Aspect 2: Aspect 1, wherein the IDC comprises a first IDC planar portion of the IDC positioned between the IDC longitudinal first end and the IDC longitudinal second end, wherein a first IDC sheath prong of the one or more IDC sheath prongs curves away from the first IDC planar portion at the first IDC longitudinal first end, and a second IDC sheath prong of the one or more IDC sheath prongs curves away from the first IDC planar portion at the IDC longitudinal second end.

Aspect 3: Aspect 2, wherein the first housing side further comprises a first housing side first curved portion and a first housing side second curved portion, wherein the first housing side first curved portion is congruent with at least a portion of the first IDC sheath prong curving away from the first IDC planar portion, and wherein the first housing side second curved portion is congruent with at least a portion of the second IDC sheath prong curving away from the first IDC planar portion.

Aspect 4: Aspect 3, wherein the one or more IDC sheath prongs comprise a third IDC sheath prong and a fourth IDC sheath prong, the third IDC sheath prong curves away from a second IDC planar portion at the IDC longitudinal first end and the fourth IDC sheath prong curves away from the second IDC planar portion at the IDC longitudinal second end, the second IDC planar portion positioned between the IDC longitudinal first end and the IDC longitudinal second end.

Aspect 5: Aspect 4, wherein the second housing side further comprises a second housing side first curved portion and a second housing side second curved portion, wherein the second housing side first curved portion is congruent with at least a portion of the third IDC sheath prong curving away from the second IDC planar portion, and wherein the second housing side second curved portion is congruent with at least a portion of the second IDC sheath prong curving away from the second IDC planar portion.

Aspect 6: Any of Aspects 1-5, wherein the sensor is in communication with the IDC via a conductible compression gasket, the conductible compression gasket contacting the IDC at a first IDC planar portion positioned between the IDC longitudinal first end and the IDC longitudinal second end.

Aspect 7: Any of Aspects 1-6, wherein the first housing side couples to the second housing side at a first location corresponding to a first housing side lateral first side and a second housing side lateral first side, and at a second location corresponding to a first housing side lateral second side and a second housing side lateral second side.

Aspect 8: Aspect 7, wherein, when the first housing side and the second housing side are coupled, a first outer surface of the first housing side lateral first side is adjacent to a first inner surface of the second housing side lateral first side, and a second outer surface of the first housing side lateral second side is adjacent a second inner surface of the second housing side lateral second side.

Aspect 9: A sensor system comprises an insulation displacement contact (IDC) that comprises a first IDC sheath prong at an IDC longitudinal first end and a second IDC sheath prong at an IDC longitudinal second end. The insulation displacement contact (IDC) comprises a first IDC planar portion extending from the first IDC sheath prong to the second IDC sheath prong, where the first IDC sheath prong curves away from the first IDC planar portion at the IDC longitudinal first end and the second IDC sheath prong curves away from the first IDC planar portion at the IDC longitudinal second end. The insulation displacement contact (IDC) comprises a third IDC sheath prong at the IDC longitudinal first end and a fourth IDC sheath prong at the IDC longitudinal second end. The insulation displacement contact (IDC) comprises a second IDC planar portion extending from the third IDC sheath prong to the fourth IDC sheath prong, where the third IDC sheath prong curves away from the second IDC planar portion at the first IDC longitudinal first end and the fourth IDC sheath prong curves away from the second IDC planar portion at the IDC longitudinal second end. The sensor systems further comprises a sensor housing that comprises a first housing side extending from a first housing side longitudinal first end to a first housing side longitudinal second end, the first housing side comprises a first housing side first curved portion and a first housing side second curved portion, where the first housing side first curved portion is congruent with at least a portion of the first IDC sheath prong, and where the first housing side second curved portion is congruent with at least a portion of the second IDC sheath prong, and a second housing side extending from a second housing side longitudinal first end to a second housing side longitudinal second end, the second housing side comprises a second housing side first curved portion and a second housing side second curved portion, where the second housing side first curved portion is congruent with at least a portion of the third IDC sheath prong and the second housing side second curved portion is congruent with at least a portion of the fourth IDC sheath prong.

Aspect 10: Aspect 9, further comprising a sensor disposed within the first housing side.

Aspect 11: Aspect 10, wherein the sensor is in communication with the IDC via a conductible compression gasket, the conductible compression gasket contacting the IDC at the first IDC planar portion.

Aspect 12: Any of Aspects 9-11, wherein the first housing side is configured to couple to the second housing side.

Aspect 13: Aspect 12, wherein the first housing side couples to the second housing side at a first location corresponding to a first housing side lateral first side and a second housing side lateral first side, and at a second location corresponding to a first housing side lateral second side and a second housing side lateral second side.

Aspect 14: Aspect 13, wherein, when the first housing side and the second housing side are coupled, a first outer surface of the first housing side lateral first side is adjacent a first inner surface of the second housing side lateral first side, and a second outer surface of the first housing side lateral second side is adjacent a second inner surface of the second housing side lateral second side.

Aspect 15: Any of Aspects 9-14, wherein the IDC continuously extends from the IDC longitudinal first end to the IDC longitudinal second end, the first housing side continuously extends from the first housing side longitudinal first end to the first housing side longitudinal second end, and the second housing side continuously extends from the second housing side longitudinal first end to the second housing side longitudinal second end.

Aspect 16: A method of assembling a sensor housing, the method comprising: securing an insulation displacement contact (IDC) to a cable comprising a conducting wire encased within an insulating sheath, the IDC secured to the conducting wire by penetrating the insulating sheath with one or more IDC sheath prongs of the IDC, such that the one or more IDC sheath prongs engage the conducting wire, wherein the IDC continuously extends from an IDC longitudinal first end to an IDC longitudinal second end; and enclosing the IDC at least partially within a sensor housing by coupling a first housing side of the sensor housing with a second housing side of the sensor housing, the first housing side extending from a first housing side longitudinal first end to a first housing side longitudinal second end, the second housing side extending from a second housing side longitudinal first end to a second housing side longitudinal second end, and wherein, when the IDC is at least partially enclosed by the sensor housing, the first housing side longitudinal first end and the second housing side longitudinal first end are proximate the IDC longitudinal first end, and the first housing side longitudinal second end and the second housing side longitudinal second end are proximate the IDC longitudinal second end.

Aspect 17: Aspect 16, wherein the sensor is in communication with the IDC via a conductible compression gasket, the conductible compression gasket contacting the IDC at a first IDC planar portion positioned between the IDC longitudinal first end and the IDC longitudinal second end.

Aspect 18: Any of Aspects 16-17, wherein the first housing side is coupled to the second housing side at a first location corresponding to a first housing side lateral first side and a second housing side lateral first side, and at a second location corresponding to a first housing side lateral second side and a second housing side lateral second side.

Aspect 19: Aspect 18, wherein, when the first housing side and the second housing side are coupled, a first outer surface of the first housing side lateral first side is adjacent to a first inner surface of the second housing side lateral first side, and a second outer surface of the first housing side lateral second side is adjacent a second inner surface of the second housing side lateral second side.

Aspect 20: Any of Aspects 16-19, wherein: the IDC further comprises: first IDC planar portion of the IDC positioned between the IDC longitudinal first end and the IDC longitudinal second end; a first IDC sheath prong of the one or more IDC sheath prongs that curves away from the first IDC planar portion at the first IDC longitudinal first end; and a second IDC sheath prong of the one or more IDC sheath prongs that curves away from the first IDC planar portion at the IDC longitudinal second end; the first housing side further comprises a first housing side first curved portion; and a first housing side second curved portion, wherein the first housing side first curved portion is congruent with at least a portion of the first IDC sheath prong curving away from the first IDC planar portion, and wherein the first housing side second curved portion is congruent with at least a portion of the second IDC sheath prong curving away from the first IDC planar portion.

What is claimed is:

1. A cable comprising:
a conducting wire encased within an insulating sheath;
an insulation displacement contact (IDC) comprising one or more IDC sheath prongs extending through the insulating sheath to the conducting wire, the IDC continuously extending from an IDC longitudinal first end to an IDC longitudinal second end;
a sensor housing at least partially enclosing the IDC, the sensor housing comprising a first housing side configured to couple with a second housing side, the first housing side continuously extending from a first housing side longitudinal first end to a first housing side longitudinal second end, the second housing side continuously extending from a second housing side longitudinal first end to a second housing side longitudinal second end, wherein the first housing side longitudinal first end and the second housing side longitudinal first end are proximate the IDC longitudinal first end, and wherein the first housing side longitudinal second end and the second housing side longitudinal second end are proximate the IDC longitudinal second end; and
a sensor disposed within the sensor housing and in communication with the IDC.

2. The cable of claim 1, wherein the IDC comprises a first IDC planar portion of the IDC positioned between the IDC longitudinal first end and the IDC longitudinal second end, wherein a first IDC sheath prong of the one or more IDC sheath prongs curves away from the first IDC planar portion at the first IDC longitudinal first end, and a second IDC sheath prong of the one or more IDC sheath prongs curves away from the first IDC planar portion at the IDC longitudinal second end.

3. The cable of claim 2, wherein the first housing side further comprises a first housing side first curved portion and a first housing side second curved portion, wherein the first housing side first curved portion is congruent with at least a portion of the first IDC sheath prong curving away from the first IDC planar portion, and wherein the first housing side second curved portion is congruent with at least a portion of the second IDC sheath prong curving away from the first IDC planar portion.

4. The cable of claim 3, wherein the one or more IDC sheath prongs comprise a third IDC sheath prong and a fourth IDC sheath prong, the third IDC sheath prong curves away from a second IDC planar portion at the IDC longitudinal first end and the fourth IDC sheath prong curves away from the second IDC planar portion at the IDC longitudinal second end, the second IDC planar portion positioned between the IDC longitudinal first end and the IDC longitudinal second end.

5. The cable of claim 4, wherein the second housing side further comprises a second housing side first curved portion and a second housing side second curved portion, wherein the second housing side first curved portion is congruent with at least a portion of the third IDC sheath prong curving away from the second IDC planar portion, and wherein the second housing side second curved portion is congruent with at least a portion of the second IDC sheath prong curving away from the second IDC planar portion.

6. The cable of claim 1, wherein the sensor is in communication with the IDC via a conductible compression gasket, the conductible compression gasket contacting the IDC at a first IDC planar portion positioned between the IDC longitudinal first end and the IDC longitudinal second end.

7. The cable of claim 1, wherein the first housing side couples to the second housing side at a first location corresponding to a first housing side lateral first side and a second housing side lateral first side, and at a second location corresponding to a first housing side lateral second side and a second housing side lateral second side.

8. The cable of claim 7, wherein, when the first housing side and the second housing side are coupled, a first outer surface of the first housing side lateral first side is adjacent to a first inner surface of the second housing side lateral first side, and a second outer surface of the first housing side lateral second side is adjacent a second inner surface of the second housing side lateral second side.

9. An sensor system comprising:
an insulation displacement contact (IDC) comprising:
a first IDC sheath prong at an IDC longitudinal first end and a second IDC sheath prong at an IDC longitudinal second end;
a first IDC planar portion extending from the first IDC sheath prong to the second IDC sheath prong, wherein the first IDC sheath prong curves away from the first IDC planar portion at the IDC longitudinal first end and the second IDC sheath prong curves away from the first IDC planar portion at the IDC longitudinal second end;
a third IDC sheath prong at the IDC longitudinal first end and a fourth IDC sheath prong at the IDC longitudinal second end;
a second IDC planar portion extending from the third IDC sheath prong to the fourth IDC sheath prong, wherein the third IDC sheath prong curves away from the second IDC planar portion at the first IDC longitudinal first end and the fourth IDC sheath prong curves away from the second IDC planar portion at the IDC longitudinal second end; and
a sensor housing comprising:
a first housing side extending from a first housing side longitudinal first end to a first housing side longitudinal second end, the first housing side comprising a first housing side first curved portion and a first housing side second curved portion, wherein the first housing side first curved portion is congruent with at least a portion of the first IDC sheath prong, and wherein the first housing side second curved portion is congruent with at least a portion of the second IDC sheath prong; and
a second housing side extending from a second housing side longitudinal first end to a second housing side longitudinal second end, the second housing side comprising a second housing side first curved portion and a second housing side second curved portion, wherein the second housing side first curved portion is congruent with at least a portion of the third IDC sheath prong and the second housing side second curved portion is congruent with at least a portion of the fourth IDC sheath prong.

10. The system of claim 9, further comprising a sensor disposed within the first housing side.

11. The system of claim 10, wherein the sensor is in communication with the IDC via a conductible compression gasket, the conductible compression gasket contacting the IDC at the first IDC planar portion.

12. The system of claim 9, wherein the first housing side is configured to couple to the second housing side.

13. The system of claim 12, wherein the first housing side couples to the second housing side at a first location corresponding to a first housing side lateral first side and a second housing side lateral first side, and at a second location corresponding to a first housing side lateral second side and a second housing side lateral second side.

14. The system of claim 13, wherein, when the first housing side and the second housing side are coupled, a first outer surface of the first housing side lateral first side is adjacent a first inner surface of the second housing side lateral first side, and a second outer surface of the first housing side lateral second side is adjacent a second inner surface of the second housing side lateral second side.

15. The system of claim 9, wherein the IDC continuously extends from the IDC longitudinal first end to the IDC longitudinal second end, the first housing side continuously extends from the first housing side longitudinal first end to the first housing side longitudinal second end, and the second housing side continuously extends from the second housing side longitudinal first end to the second housing side longitudinal second end.

16. A method of assembling a sensor housing, the method comprising:
securing an insulation displacement contact (IDC) to a cable comprising a conducting wire encased within an insulating sheath, the IDC secured to the conducting wire by penetrating the insulating sheath with one or more IDC sheath prongs of the IDC, such that the one or more IDC sheath prongs engage the conducting wire, wherein the IDC continuously extends from an IDC longitudinal first end to an IDC longitudinal second end; and
enclosing the IDC at least partially within a sensor housing by coupling a first housing side of the sensor housing with a second housing side of the sensor housing, the first housing side extending from a first housing side longitudinal first end to a first housing side longitudinal second end, the second housing side extending from a second housing side longitudinal first end to a second housing side longitudinal second end, and wherein, when the IDC is at least partially enclosed by the sensor housing, the first housing side longitudinal first end and the second housing side longitudinal first end are proximate the IDC longitudinal first end, and the first housing side longitudinal second end and the second housing side longitudinal second end are proximate the IDC longitudinal second end.

17. The method of claim 16, wherein the sensor is in communication with the IDC via a conductible compression gasket, the conductible compression gasket contacting the IDC at a first IDC planar portion positioned between the IDC longitudinal first end and the IDC longitudinal second end.

18. The method of claim 16, wherein the first housing side is coupled to the second housing side at a first location corresponding to a first housing side lateral first side and a second housing side lateral first side, and at a second location corresponding to a first housing side lateral second side and a second housing side lateral second side.

19. The method of claim 18, wherein, when the first housing side and the second housing side are coupled, a first outer surface of the first housing side lateral first side is adjacent to a first inner surface of the second housing side lateral first side, and a second outer surface of the first housing side lateral second side is adjacent a second inner surface of the second housing side lateral second side.

20. The method of claim 16, wherein:
the IDC further comprises:
a first IDC planar portion of the IDC positioned between the IDC longitudinal first end and the IDC longitudinal second end;
a first IDC sheath prong of the one or more IDC sheath prongs that curves away from the first IDC planar portion at the first IDC longitudinal first end; and
a second IDC sheath prong of the one or more IDC sheath prongs that curves away from the first IDC planar portion at the IDC longitudinal second end; and
the first housing side further comprises:
a first housing side first curved portion; and
a first housing side second curved portion, wherein the first housing side first curved portion is congruent with at least a portion of the first IDC sheath prong curving away from the first IDC planar portion, and wherein the first housing side second curved portion is congruent with at least a portion of the second IDC sheath prong curving away from the first IDC planar portion.

* * * * *